United States Patent
Hsieh et al.

(10) Patent No.: US 9,734,788 B2
(45) Date of Patent: Aug. 15, 2017

(54) TOUCH DISPLAY DEVICE

(71) Applicant: InnoLux Corporation, Jhu-Nan, Miao-Li County (TW)

(72) Inventors: Hong-Sheng Hsieh, Jhu-Nan (TW); Jian-Cheng Chen, Jhu-Nan (TW); Shusaku Naito, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 5 days.

(21) Appl. No.: 14/813,795

(22) Filed: Jul. 30, 2015

(65) Prior Publication Data

US 2016/0034077 A1 Feb. 4, 2016

(30) Foreign Application Priority Data

Aug. 1, 2014 (TW) .............................. 103126453 A (51) Int. Cl.
| | |
|---|---|
| *G06F 3/047* | (2006.01) |
| *G02F 1/1335* | (2006.01) |
| *G06F 3/041* | (2006.01) |
| *G09G 5/00* | (2006.01) |
| *G02F 1/1333* | (2006.01) |
| *G06F 3/044* | (2006.01) |

(52) U.S. Cl.
CPC ......... *G09G 5/003* (2013.01); *G02F 1/13338* (2013.01); *G06F 3/041* (2013.01); *G06F 3/047* (2013.01); *G02F 1/133528* (2013.01); *G06F 3/044* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 7,130,638 | B2 * | 10/2006 | Chen ...................... | H04W 72/10 455/450 |
| 9,052,766 | B2 * | 6/2015 | Dunphy ................ | G06F 3/0412 |
| 9,298,328 | B2 * | 3/2016 | Kurasawa ............... | G06F 3/044 |
| 9,423,915 | B2 * | 8/2016 | Kang .................... | G06F 1/1652 |
| 2012/0327349 | A1 * | 12/2012 | Wang .................. | G02F 1/13338 349/139 |
| 2013/0194527 | A1 * | 8/2013 | Kim .................. | G02F 1/134309 349/43 |
| 2013/0294037 | A1 * | 11/2013 | Kuriki ...................... | H05K 9/00 361/748 |

(Continued)

*Primary Examiner* — Dismery Mercedes
(74) *Attorney, Agent, or Firm* — Muncy, Geissler, Olds & Lowe, P.C.

(57) ABSTRACT

A touch display device comprises a first substrate, a second substrate disposed opposite the first substrate, a plurality of touch electrode patterns and a first polarization element. The touch electrode patterns include a plurality of touch electrodes and wires. The wires are electrically connected with the touch electrodes, disposed on the first substrate and arranged along a first direction. The first polarization element is disposed on the first substrate and has a first absorption axis. One of the wires is formed by the connection of a plurality of wire segments, and one of the wire segments is formed by the connection of a plurality of segments. Each of the segments forms a vector by towards the same side, the vectors have a sum vector, and the included angle between the sum vector and the first absorption axis is greater than 0° and less than or equal to 20°.

15 Claims, 8 Drawing Sheets

(56) References Cited

U.S. PATENT DOCUMENTS

| | | | |
|---|---|---|---|
| 2014/0320760 A1* | 10/2014 | Ishizaki | G06F 3/044 349/12 |
| 2015/0212622 A1* | 7/2015 | Hirata | G06F 3/044 345/174 |
| 2015/0227237 A1* | 8/2015 | Ono | G06F 3/044 345/174 |
| 2015/0286308 A1* | 10/2015 | Guard | G06F 3/0416 345/174 |
| 2015/0286323 A1* | 10/2015 | Iwami | G06F 3/041 345/174 |
| 2015/0382446 A1* | 12/2015 | Kwon | H05K 1/028 174/251 |
| 2016/0092004 A1* | 3/2016 | Yoshiki | G06F 3/047 345/174 |

\* cited by examiner

TOUCH DISPLAY DEVICE

CROSS REFERENCE TO RELATED APPLICATIONS

This Non-provisional application claims priority under 35 U.S.C. §119(a) on Patent Application No(s). 103126453 filed in Taiwan, Republic of China on Aug. 1, 2014, the entire contents of which are hereby incorporated by reference.

BACKGROUND OF THE INVENTION

Field of Invention

The invention relates to a touch display device and an on-cell touch display device.

Related Art

With the progress of technologies, various novel information devices are invented, such as cell phones, tablet computers, ultrabooks and GPS navigation devices. Generally, a keyboard and mouse are commonly used to manipulate the information device for inputting information. Besides, the touch control technology currently also becomes a popular manipulation method for the information device and brings an intuitive operation. Accordingly, a touch display device using the touch control technology can provide a friendly and intuitive interface for the input operation, and therefore users of all ages can manipulate the touch display device by fingers or a stylus.

A conventional touch display device includes a color filter (CF) substrate, a liquid crystal layer, a thin film transistor (TFT), a touch sensing structure and two upper and lower polarization plates. The liquid crystal layer is disposed between the CF substrate and the TFT substrate, and the touch sensing structure is disposed on the CF substrate. The lower polarization plate is disposed on the side of the TFT substrate away from the CF substrate, and the upper polarization plate is disposed on the touch sensing structure. Then, a cover glass is disposed on the upper polarization plate to form an on-cell touch display device.

Another conventional touch display device includes an organic light emitting diode (OLED) substrate, a touch sensing structure and an upper polarization plate. The touch sensing structure is disposed on the OLED substrate and the upper polarization plate is disposed on the touch sensing structure. Then, a cover glass is disposed on the upper polarization plate to form another on-cell touch display device.

The touch sensing structure is generally an electrode structure including a plurality of wire regions and touch sensing regions disposed alternately. The touch sensing region includes driving electrodes and sensing electrodes (the so-called Tx and Rx) and the wire region includes a plurality of wires connected to a touch control circuit. However, due to the reflectivity difference between the electrode patterns and the slits of the touch sensing region and wire region, the bright and dark fringes caused by different directions of the reflected lights are easily to be seen in a particular viewing angle (or under a blaze), resulting in a bad visibility (which means users will easily see the electrode patterns).

Therefore, it is an important subject to provide a touch display device whereby the bright and dark fringes caused by the different directions of the reflected lights can be reduced so as to enhance the visibility.

SUMMARY OF THE INVENTION

In view of the foregoing subject, an objective of the invention is to provide a touch display device whereby the bright and dark fringes caused by the different directions of the reflected lights can be reduced so as to enhance the visibility.

To achieve the above objective, a touch display device according to the invention comprises a first substrate, a second substrate disposed opposite the first substrate, a plurality of touch electrode patterns and a first polarization element. The touch electrode patterns include a plurality of touch electrodes and wires. The wires are electrically connected with the touch electrodes, disposed on the first substrate and arranged along a first direction. The first polarization element is disposed on the first substrate and has a first absorption axis. One of the wires is formed by the connection of a plurality of wire segments, and one of the wire segments is formed by the connection of a plurality of segments. Each of the segments forms a vector by towards the same side, the vectors have a sum vector, and the included angle between the sum vector and the first absorption axis is greater than 0° and less than or equal to 20°.

In one embodiment, the included angle between the sum vector and the first absorption axis is further greater than 0° and less than or equal to 10°.

In one embodiment, each of the wires is a bending wire.

In one embodiment, the first substrate, the second substrate and a liquid crystal layer disposed between the first substrate and the second substrate form a liquid crystal display panel, the liquid crystal display panel includes at least a sub-pixel, and the length of one of the wire segments is between triple the width of the sub-pixel along a second direction and a specific value.

In one embodiment, the specific value ranges between 350 μm and 700 μm.

In one embodiment, each of the wires is formed by the connection of a plurality of wire segments which occur periodically.

In one embodiment, the touch display device further comprises an optical element disposed on the first polarization element.

In one embodiment, the optical element is a quarter wave plate.

In one embodiment, each of the wire segments at least includes three segments having different extending directions.

In one embodiment, the touch display device further includes a second polarization element disposed on the side of the second substrate away from the first substrate. The second polarization element has a second absorption axis which is perpendicular to the first absorption axis.

To achieve the above objective, a touch display device according to the invention comprises a liquid crystal display panel and a plurality of touch electrode patterns. The liquid crystal display panel is formed by a first substrate, a second substrate and a liquid crystal layer disposed between the first substrate and the second substrate. The liquid crystal display panel includes at least a sub-pixel. The touch electrode patterns include a plurality of touch electrodes and a plurality of wires, which are electrically connected with the touch electrodes, disposed on the first substrate and arranged along a first direction. One of the wires is formed by the connection of a plurality of wire segments. The length of one of the wire segments is between triple the width of the sub-pixel along a second direction and a specific value.

In one embodiment, the touch display device further comprises a first polarization element disposed on the first substrate and having a first absorption axis. One of the wire segments is formed by the connection of a plurality of segments, each of the segments forms a vector by towards the same side, and the vectors have a sum vector. The included angle between the sum vector and the first absorption axis is greater than 0° and less than or equal to 20°.

As mentioned above, in this touch display device of this invention, the film attachment angle between the sum vector formed by the wire segment of the wire of the touch electrode pattern and the first absorption axis of the first polarization element is greater than or equal to 0° and less than or equal to 10°, so the reflected light can be easily absorbed when passing through the first polarization element 14. Or, the length of a wire segment is between triple the width of the sub-pixel along the second direction and a specific value, so the direction of the reflected light can be not limited to a particular direction so that the wire segments can fall into the less sensible spatial frequency of the human vision (i.e. the higher spatial frequency). Therefore, the brightness of the reflected lights of the electrode patterns and slits can be all lower than the brightness that the human eyes can perceive, so that the bright and dark fringes caused by the different directions of the reflected lights of the touch display device can be reduced and the visibility of the touch display device can be thus enhanced.

BRIEF DESCRIPTION OF THE DRAWINGS

The invention will become more fully understood from the detailed description and accompanying drawings, which are given for illustration only, and thus are not limitative of the disclosure, and wherein.

DETAILED DESCRIPTION OF THE INVENTION

The disclosure will be apparent from the following detailed description, which proceeds with reference to the accompanying drawings, wherein the same references relate to the same elements.

Figure 1:
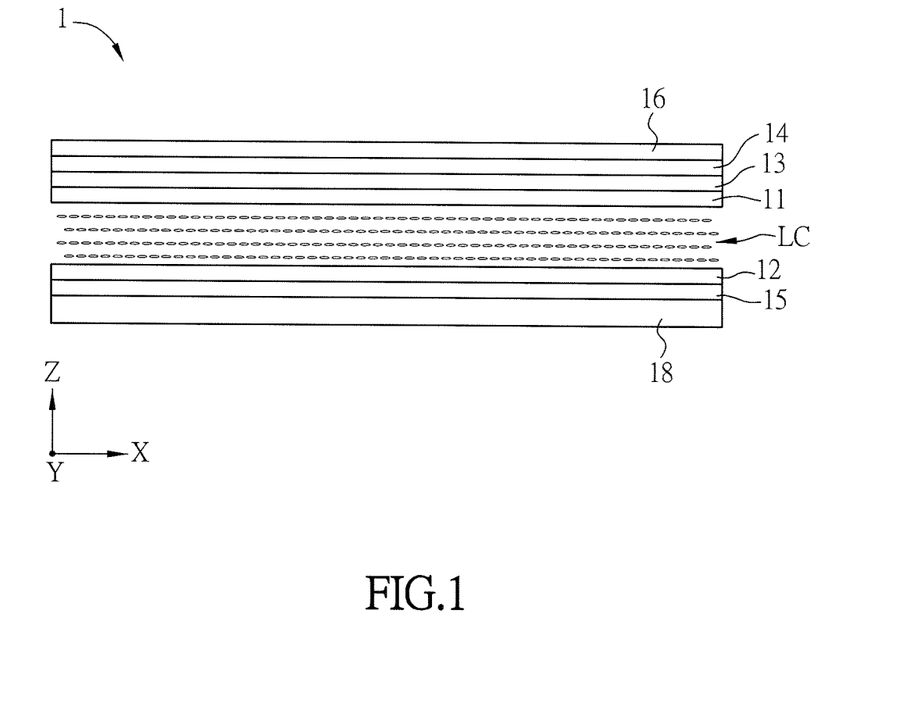
FIG. 1 is a schematic diagram of a touch display device of an embodiment of the invention.
Figure 2A:
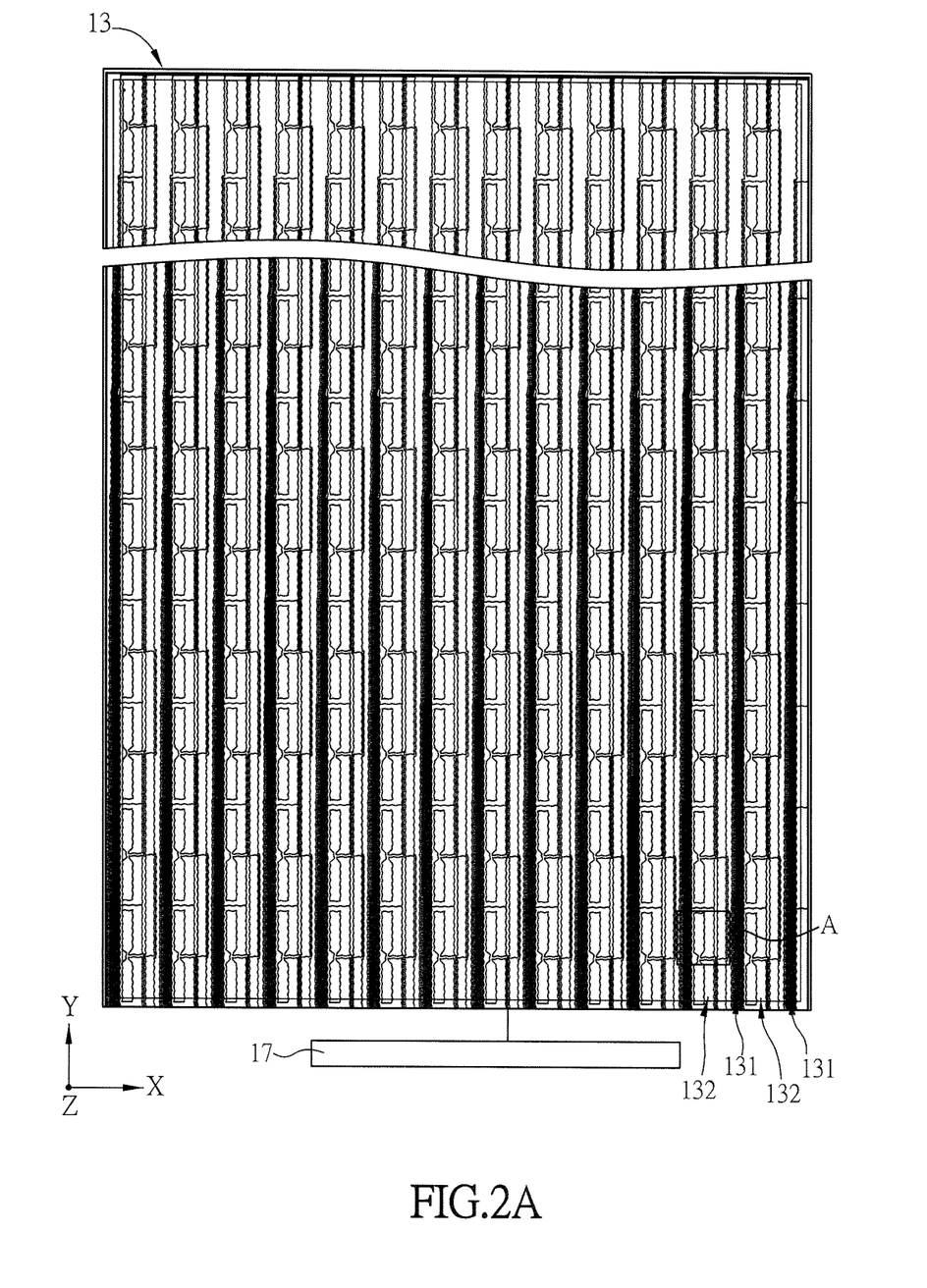
FIG. 2A is a schematic top view of the touch sensing structure of the touch display device in FIG. 1.

FIG. 1 is a schematic diagram of a touch display device 1 of an embodiment of the invention, and FIG. 2A is a schematic top view of the touch sensing structure 13 of the touch display device 1 in FIG. 1. Refer to FIGS. 1 and 2A. In order to facilitate the following illustration, the first direction X, the second direction Y and the third direction Z are shown in the figures, and any two of them can be perpendicular to each other. For example, the first direction X can be substantially parallel to the extending direction of the scan line of the touch display device 1, the second direction Y can be substantially parallel to the extending direction of the data line of the touch display device 1, and the third direction Z can be perpendicular to the first direction X and the second direction Y. However, in other embodiments, the first direction X and the second direction Y may form an acute angle therebetween in stead of being perpendicular to each other.

The touch display device 1 of this embodiment is an on-cell touch display device and includes a first substrate 11, a liquid crystal layer LC, a second substrate 12, a touch sensing structure 13, a first polarization element 14 and a second polarization element 15. Moreover, the touch display device 1 can further include a protection substrate 16, which is, for example but not limited to, a cover glass. The protection substrate 16 can protect the touch display device 1 from the collision or the invasion of external objects or moisture.

The first substrate 11 and the second substrate 12 are disposed oppositely. The first substrate 11 or the second substrate 12 can be made by transparent material, such as glass, quartz or the like, plastic material, rubber, fiberglass or other polymer materials, or can be made by opaque material. Each of the first substrate 11 and the second substrate 12 can be a metal-fiberglass composite plate, a metal-ceramic composite plate, a printed circuit board or another kind of substrate. In this embodiment, the first substrate 11 and the second substrate 12 are made by transparent glass for example. The touch display device 1 can further include a TFT array, a CF array and a black matrix layer (not shown). The TFT array is disposed on the second substrate 12, and the CF array or the black matrix layer can be disposed on the first substrate 11 or the second substrate 12. In one embodiment, the black matrix layer and the CF array can be disposed on the first substrate 11. However, in other embodiments, the black matrix layer or the CF array can be disposed on the second substrate 12 to make a BOA (BM on array) substrate or a COA (color filter on array) substrate. However, this invention is not limited thereto. The liquid crystal layer LC is disposed between the first substrate 11 and the second substrate 12. The first substrate 11, the second substrate 12, the liquid crystal layer LC, the TFT array and the CF array can form a liquid crystal display (LCD) panel, which includes a pixel array including at least sub-pixel (not shown). Herein for example, the pixel array includes a plurality of sub-pixels. Moreover, the touch display device 1 can further include a plurality of scan lines and a plurality of data lines (not shown), both of which cross each other, perpendicularly for example, to define the area of the pixel array.

The first polarization element 14 is disposed on the first substrate 11, and the second polarization element 15 is disposed on the side of the second substrate 12 away from the first substrate 11. The first polarization element 14 has a first absorption axis, and the second polarization element 15 has a second absorption axis which is perpendicular to the first absorption axis. Herein, the first polarization element 14 and the second polarization element 15 are both a polarizer, and the light will be absorbed by the polarizer when the polarization state of the light is the same direction as the absorption axis. By the polarization elements 14, 15 with the two absorption axes having a 90° difference, the light of the backlight module can be shielded, and the image display can be achieved by controlling the intensity of the electric field to rotate the liquid crystal to modulate the polarization of the light.

The touch sensing structure 13 is disposed on the first substrate 11 and includes a plurality of touch electrode patterns, each of which includes a wire region 131 and a driving sensing region 132 adjacent to the wire region 131. In other words, as shown in FIG. 2A, the touch sensing structure 13 includes a plurality touch electrode patterns arranged repeatedly along the first direction X, and each of the touch electrode patterns can include a wire region 131 and a driving sensing region 132. As the name implies, the driving sensing region 132 is just the region where a plurality of touch electrodes (including a plurality of driving electrodes Tx and a plurality of sensing electrodes Rx) are disposed, and the wire region 131 is just the region where the wires are disposed for connecting the touch electrodes of the driving sensing region 132 and a control circuit board 17. The touch signal can be generated when the touch electrode of the touch sensing structure 13 is touched, and the touch signal can be transmitted to the control circuit board 17 to result in the corresponding control operation.

Figure 2B:
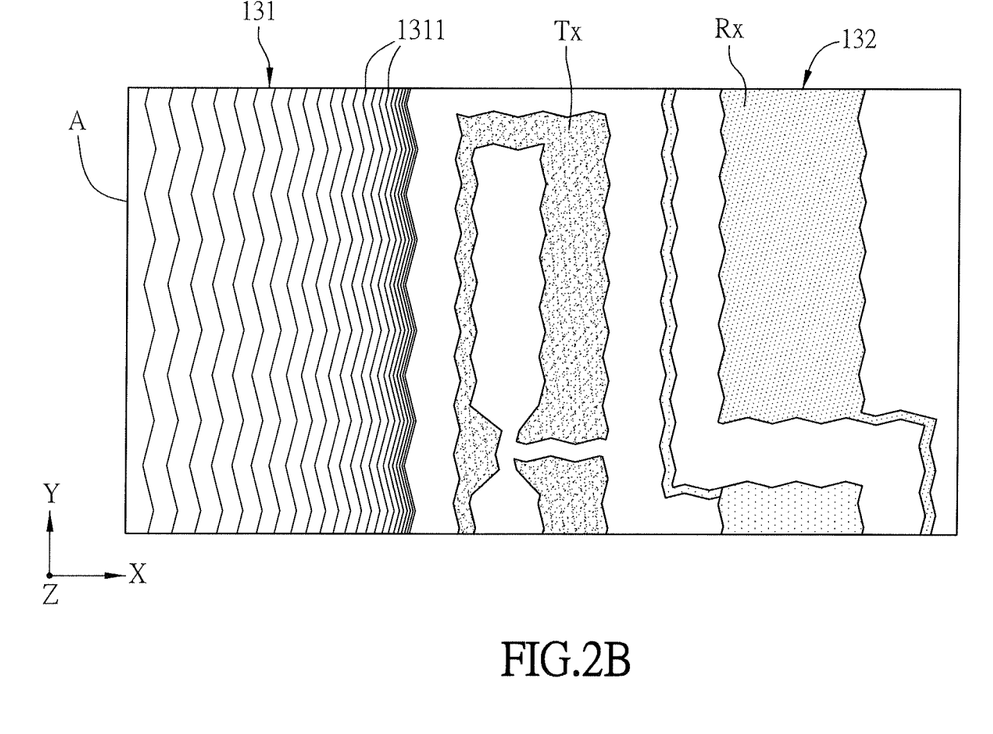
FIG. 2B is a schematic enlarged diagram of the region A in FIG. 2A.

FIG. 2B is a schematic enlarged diagram of the region A in FIG. 2A and shows a wire region 131 and a driving sensing region 132. The enlargement of FIG. 2B is just for the illustrative purpose but not for showing the real enlargement scale. Moreover, the region A of this embodiment is closer to the control circuit board 17 (having more wires 1311). For example, the region A is the region of the touch sensing structure 13 with the edge from the control circuit board 17 by three centimeters or less, and this region has more wires.

As shown in FIG. 2B, the driving sensing region 132 includes a plurality of touch electrodes formed by the driving electrodes Tx and the sensing electrodes Rx, and the wire region 131 includes a plurality of wires 1311 extended towards the same side (such as the underside of the region A, i.e. towards the control circuit board 17). The wires 1311 are electrically connected with the driving electrodes Tx and the sensing electrodes Rx, and are disposed on the first substrate 11 and arranged along the first direction X.

Figure 3A:
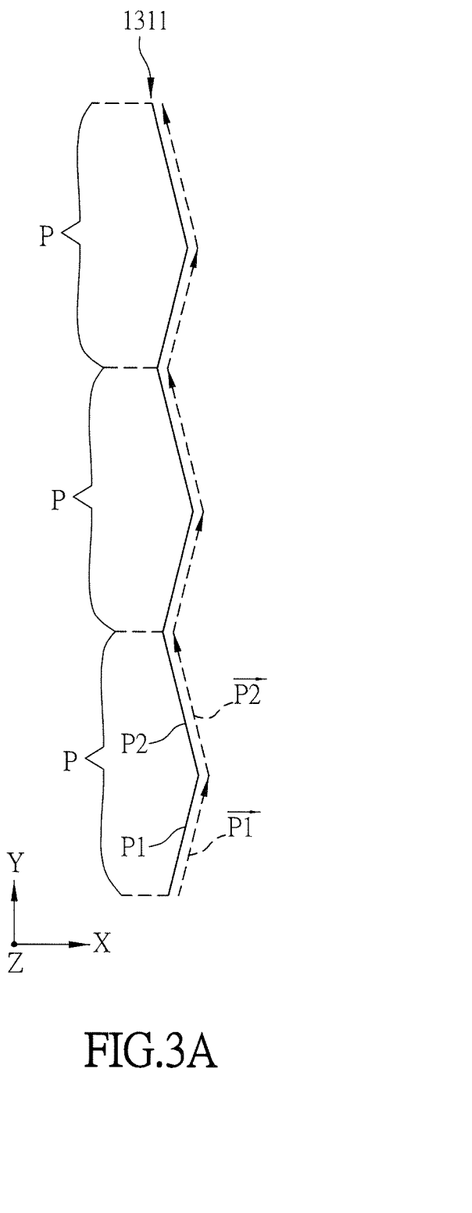
FIG. 3A is a schematic diagram showing the connection of a plurality wire segments of a wire of the touch sensing structure.
Figure 3B:
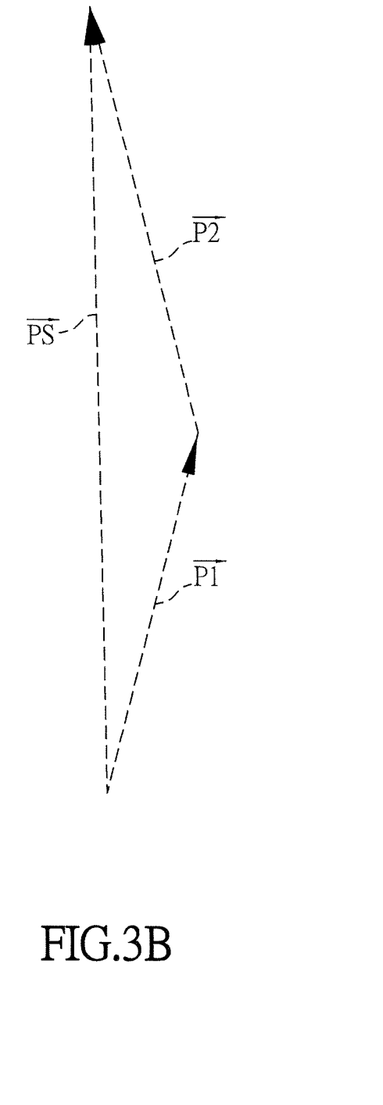
FIG. 3B is a schematic diagram showing the vectors formed by a wire segment.

Refer to FIGS. 3A and 3B. FIG. 3A is a schematic diagram showing the connection of a plurality wire segments P of a wire 1311 of the touch sensing structure 13, and FIG. 3B is a schematic diagram showing the vectors formed by a wire segment P. Herein, the connection of three wire segments P is shown in FIG. 3A.

One of the wires 1311 is fainted by the connection of a plurality wire segments P, and the length of a wire segment P is between triple the width of the sub-pixel along the second direction Y and a specific value. The above specific value ranges between 350 µm and 700 µm, and is 617 µm favorably for example. In this embodiment, each of the wires 1311 is formed by the connection of a plurality of wire segments P which occur periodically, and each of the wire segments P is formed by the connection of a plurality segments. Herein, the above periodical property indicates each of the wire segments P is the same.

Each of the wires 1311 can be a bending wire (including at least a bending portion) so as to have a zigzag form. Specifically, each of the wire segments P is formed by the connection of a plurality of segments. In this embodiment, a wire segment P is formed by the connection of two segments P1, P2, and the segments P1, P2, as shown in FIG. 3B, form the vectors $\vec{P1}, \vec{P2}$ by towards the same side (such as the top side of the touch sensing structure 13, i.e. the upper side of FIG. 2A; or may be towards the side of the control circuit board 17, i.e. the lower side of FIG. 2A). Since the vector includes magnitude and direction, the magnitude can be the length of the segment P1, P2 and the direction can be the extending direction of the segment P1, P2. Therefore, as shown in FIG. 3B, the length and extending direction of the segment P1, P2 can be regarded as a vector $\vec{P1}, \vec{P2}$. The sum of the vectors $\vec{P1}, \vec{P2}$ can be regarded as a sum vector $\vec{PS}$, and the included angle between the sum vector $\vec{PS}$ of this embodiment and the first absorption axis of the first polarization element 14 can be greater than 0° and less than or equal to 20° and favorably greater than 0° and less than or equal to 10°. Much favorably, the above included angle can be equal to 0° (indicating the directions of the sum vector $\vec{PS}$ and first absorption axis are parallel to each other). To be noted, a wire segment P is formed by the segments P1, P2 in this embodiment, but in other embodiments, the wire segment P may be formed by three or more segments.

As shown in FIG. 1, the touch display device 1 can further include a backlight module 18, which is disposed opposite the second substrate 12. The backlight module 18 can emit the light into the LCD panel so that the LCD panel can display images. The backlight module 18 can include a light guiding plate, a reflective plate and a plurality of optical films. Since the backlight module 18 belongs to the conventional art, those skilled in the art can comprehend that the functions and relative disposition of the components of the backlight module 18, and therefore the related illustration is omitted here for conciseness.

Figure 3C:
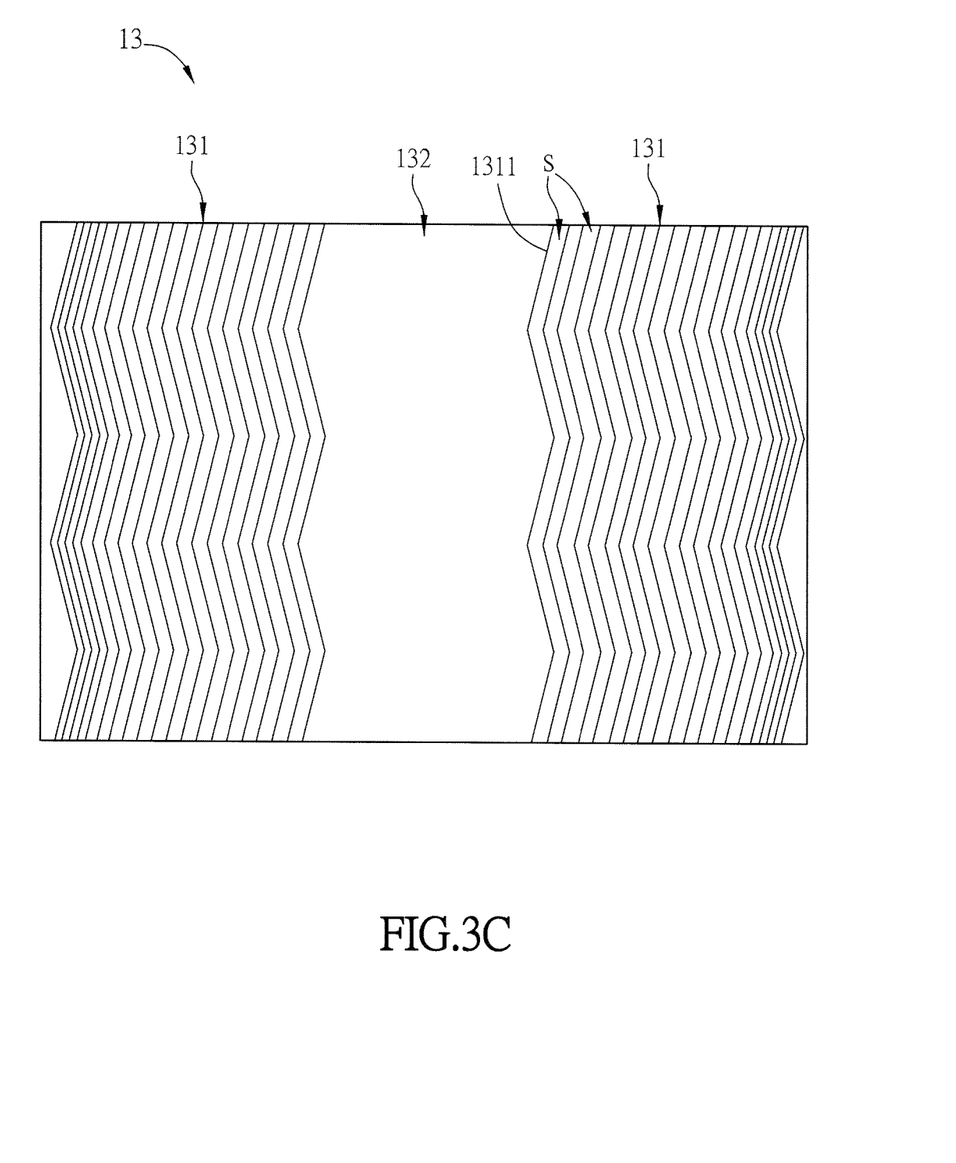
FIG. 3C is a schematic diagram of a part of the wire region and driving sensing region of the touch sensing structure of an embodiment of the invention.

FIG. 3C is a schematic diagram of a part of the wire region 131 and driving sensing region 132 of the touch sensing structure 13 of an embodiment of the invention. Herein, two wire regions 131 and a driving sensing region 132 are shown in FIG. 3C, but the patterns of the driving electrode and sensing electrode are not shown in the driving sensing region 132.

Through the experimental demonstration, when the film attachment angle between the sum vector $\vec{PS}$ formed by the wire segment P of the wire 1311 of the touch sensing structure 13 and the first absorption axis of the first polarization element 14 is greater than 0° and less than or equal to 20°, the reflected light can be easily absorbed when passing through the first polarization element 14. Or, when the length of a wire segment P is between triple the width of the sub-pixel along the second direction Y and a specific value, the direction of the reflected light can be not limited to a particular direction so that the wire segments P can fall into the less sensible spatial frequency of the human vision (i.e. the higher spatial frequency). Therefore, the brightness of the reflected lights of the electrode patterns and slits s (the region between the two electrodes or two wires 1311) can be all lower than the brightness that the human eyes can perceive, so that the bright and dark fringes caused by the different directions of the reflected lights of the touch display device 1 can be reduced and the visibility of the touch sensing structure 13 (touch display device 1) can be thus enhanced.

Figure 4:
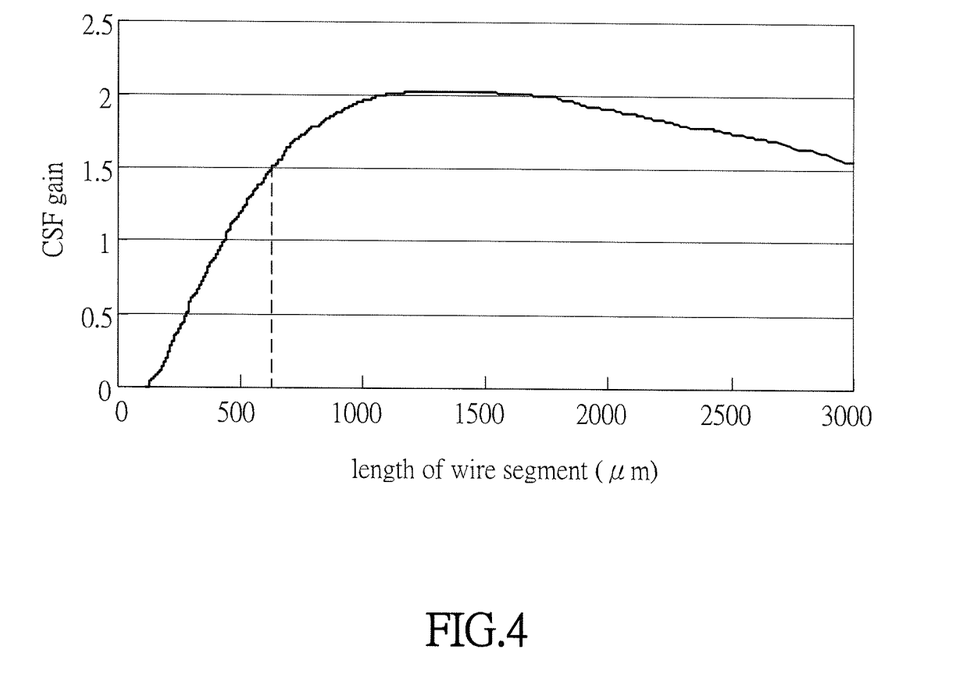
FIG. 4 is a schematic diagram showing the relation between the sensitivity of the human eyes to the spatial frequency and the wire segment.

FIG. 4 is a schematic diagram showing the relation between the sensitivity of the human eyes to the spatial frequency and the wire segment P, wherein the vertical axis represents the visual sensitivity function gain (CSF gain) and the horizontal axis represents the length of the wire segment P. The higher CSF gain shows the more that the human eye can easily perceive and further shows a bad visibility. Therefore, the optimum design of the length of the wire segment P can effectively reduce the occurrence that the pattern of the touch sensing structure 13 is evidently seen under a blaze. If the gain is less than 1.5, a good visibility is provided and is acceptable for the human eye. In consideration of the design and moiré situation, a design of the wire segment P of this embodiment can be as follows: the length of a wire segment P is between triple the width of the sub-pixel along the second direction Y and 617 μm (i.e. length of three sub-pixels<P<617 μm). Thereby, the visibility can be improved.

Figure 5A:
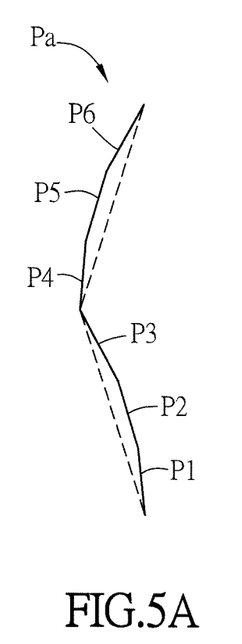
FIGS. 5A to 5C are schematic diagrams of the wire segments of different embodiments of the invention.
Figure 5B:
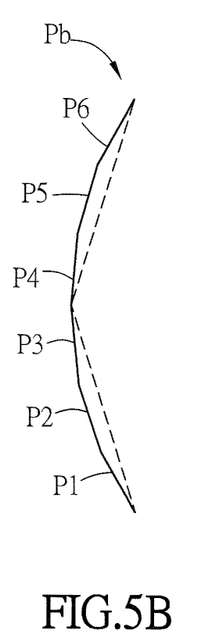
Figure 5C:
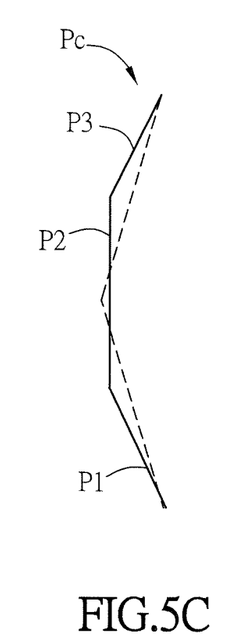

FIGS. 5A to 5C are schematic diagrams of the wire segments Pa, Pb, Pc of different embodiments of the invention, wherein the dotted line schematically represents the wire segment P of the previous embodiment and the solid line schematically represents the wire segment Pa, Pb, Pc.

In some embodiments, the wire segment at least can include three segments extended differently. For example, as shown in FIG. 5A, the wire segment Pa includes six segments P1~P6 having different extending directions. As shown in FIG. 5B, the wire segment Pb also includes six segments P1~P6 having different extending directions, but the extending directions of the segments P1~P3 of the wire segment Pb are different from those of the segments P1~P3 of the wire segment Pa. Moreover, as shown in FIG. 5C, the wire segment Pc includes three segments P1~P3 having different extending directions.

Figure 6:
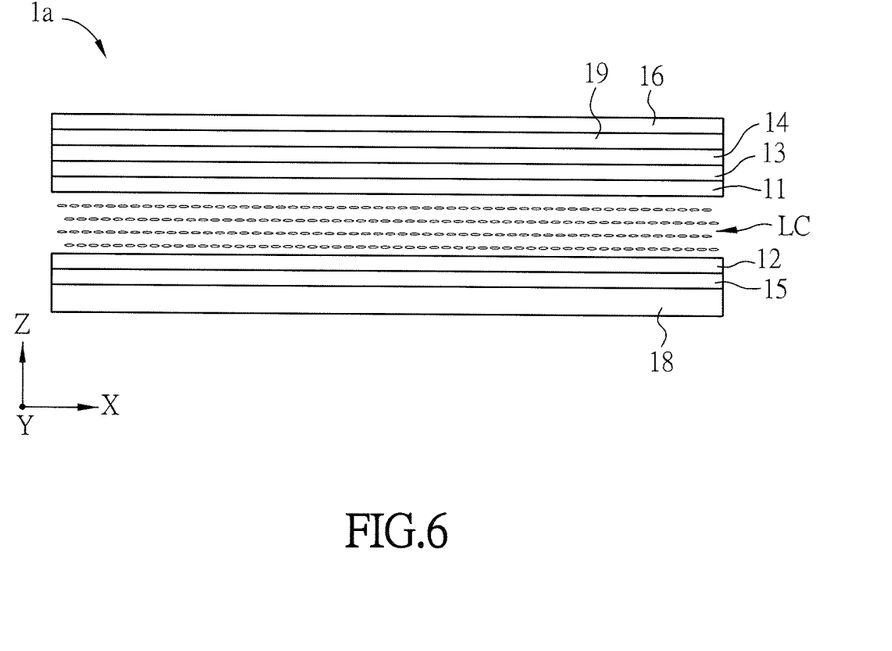
FIG. 6 is a schematic diagram of a touch display device of another embodiment of the invention.

FIG. 6 is a schematic diagram of a touch display device 1a of another embodiment of the invention.

As shown in FIG. 6, the main difference from the touch display device 1 is that the touch display device 1a can further include an optical element 19 disposed on the first polarization element 14. Herein for example, the optical element 19 is a quarter wave plate (QWP) disposed between the first polarization element 14 and the protection substrate 16. The purpose of the optical element 19 is to provide the improvement (making the linearly polarized light become the circularly polarized light) when the displayed image can't be seen by the user wearing sunglasses due to the film attachment angle of the first polarization element 14.

Summarily, in this touch display device of this invention, the film attachment angle between the sum vector formed by the wire segment of the wire of the touch electrode pattern and the first absorption axis of the first polarization element is greater than or equal to 0° and less than or equal to 10°, so the reflected light can be easily absorbed when passing through the first polarization element 14. Or, the length of a wire segment is between triple the width of the sub-pixel along the second direction and a specific value, so the direction of the reflected light can be not limited to a particular direction so that the wire segments can fall into the less sensible spatial frequency of the human vision (i.e. the higher spatial frequency). Therefore, the brightness of the reflected lights of the electrode patterns and slits can be all lower than the brightness that the human eyes can perceive, so that the bright and dark fringes caused by the different directions of the reflected lights of the touch display device can be reduced and the visibility of the touch display device can be thus enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch display device, comprising:
    a first substrate;
    a second substrate disposed opposite the first substrate;
    a plurality of touch electrode patterns including a plurality of touch electrodes and a plurality of wires electrically connected with the touch electrodes, wherein the plurality of touch electrode patterns are disposed on the first substrate and arranged along a first direction; and
    a first polarization element disposed on the first substrate and having a first absorption axis,
    wherein one of the wires is formed by the connection of a plurality of wire segments, one of the wire segments is formed by the connection of a plurality of segments, each of the segments forms a vector toward a same side of the touch display device, the vectors have a sum vector, and an included angle between the sum vector and the first absorption axis is greater than 0° and less than or equal to 20°.

2. The touch display device as recited in claim 1, wherein the included angle between the sum vector and the first absorption axis is further greater than 0° and less than or equal to 10°.

3. The touch display device as recited in claim 1, wherein each of the wires is a bending wire.

4. The touch display device as recited in claim 1, wherein the first substrate, the second substrate and a liquid crystal layer disposed between the first substrate and the second substrate form a liquid crystal display panel, the liquid crystal display panel includes at least a sub-pixel, and a length of one of the wire segments is between triple the width of the sub-pixel along a second direction and a specific value.

5. The touch display device as recited in claim 4, wherein the specific value ranges between 350 μm and 700 μm.

6. The touch display device as recited in claim 1, wherein each of the wires is formed by the connection of a plurality of wire segments which occur periodically.

7. The touch display device as recited in claim 1, further comprising:
    an optical element disposed on the first polarization element.

8. The touch display device as recited in claim 7, wherein the optical element is a quarter wave plate.

9. The touch display device as recited in claim 1, wherein each of the wire segments at least includes three segments having different extending directions.

10. A touch display device, comprising:
    a liquid crystal display panel formed by a first substrate, a second substrate and a liquid crystal layer disposed between the first substrate and the second substrate, and including at least a sub-pixel; and
    a plurality of touch electrode patterns including a plurality of touch electrodes and a plurality of wires electrically connected with the touch electrodes, wherein the plurality of touch electrode patterns are disposed on the first substrate and arranged along a first direction,
    a first polarization element disposed on the first substrate and having a first absorption axis, wherein one of the wire segments is formed by a connection of a plurality of segments, each of the segments forms a vector toward a same side of the touch display device, the vectors have a sum vector, and the included angle between the sum vector and the first absorption axis is greater than 0° and less than or equal to 20°,
    wherein the length of one of the wire segments is between triple the width of the sub-pixel along a second direction and a specific value.

11. The touch display device as recited in claim 10, wherein the specific value ranges between 350 μm and 700 μm.

12. The touch display device as recited in claim 10, wherein the included angle between the sum vector and the first absorption axis is further greater than 0° and less than or equal to 10°.

13. The touch display device as recited in claim 10, further comprising:
   an optical element disposed on the first polarization element.

14. The touch display device as recited in claim 13, wherein the optical element is a quarter wave plate.

15. The touch display device as recited in claim 10, wherein each of the wire segments at least includes three segments having different extending directions.

\* \* \* \* \*